United States Patent [19]

Stephens

[11] Patent Number: 4,983,828

[45] Date of Patent: Jan. 8, 1991

[54] OPTO ELECTRONIC SCALE READING APPARATUS WHEREIN EACH OF A PLURALITY OF DETECTORS RECEIVES LIGHT FROM A CORRESPONDING EMITTER OF A PLURALITY OF LIGHT EMITTERS

[75] Inventor: William F. N. Stephens, Glos, United Kingdom

[73] Assignee: Renishaw plc, Gloucestershire, United Kingdom

[21] Appl. No.: 396,808

[22] Filed: Aug. 21, 1989

[30] Foreign Application Priority Data

Jun. 21, 1986 [GB] United Kingdom ............... 8615196

[51] Int. Cl.$^5$ ............................................. H01J 3/14
[52] U.S. Cl. ............................ 250/237 G; 250/231.16
[58] Field of Search ........ 250/237 G, 231 SE, 231.16; 356/374, 375, 395; 341/13; 33/707

[56] References Cited

U.S. PATENT DOCUMENTS

| | | | |
|---|---|---|---|
| 3,344,700 | 10/1967 | Brake | 88/14 |
| 3,586,665 | 6/1971 | Weyrauch | 250/237 G |
| 4,079,252 | 3/1978 | Brake | 250/237 G |
| 4,115,008 | 9/1978 | Shepherd | 356/374 |
| 4,152,589 | 5/1979 | Mitchell | 250/231 SE |
| 4,222,633 | 9/1980 | Hock | 356/395 |
| 4,311,389 | 1/1982 | Fay et al. | 250/237 G |
| 4,369,366 | 1/1983 | Schmitt | 250/237 G |
| 4,461,083 | 7/1984 | Ernst | 356/374 |
| 4,472,629 | 9/1984 | Ort | 250/237 G |
| 4,722,600 | 2/1988 | Chiang | 356/374 |
| 4,722,605 | 2/1988 | Livnat et al. | 356/374 |

FOREIGN PATENT DOCUMENTS

| | | |
|---|---|---|
| 2451994 | 11/1976 | Fed. Rep. of Germany . |
| 2720195 | 11/1977 | Fed. Rep. of Germany . |
| 1002954 | 9/1965 | United Kingdom . |
| 1504691 | 3/1978 | United Kingdom . |
| 1516536 | 7/1978 | United Kingdom . |
| 1592705 | 7/1981 | United Kingdom . |
| 2095399 | 9/1982 | United Kingdom . |

OTHER PUBLICATIONS

Japan Abstracts, Optical Scale Reader, Appln No. 59-10661, 1/1984.
"Interference-Generated Moire Fringes in a System of Three Reflection Gratings", Kulindzhi et al., Optical Tech., vol. 38, No. 10, Oct. 1971.

*Primary Examiner*—David C. Nelms
*Attorney, Agent, or Firm*—Spencer & Frank

[57] ABSTRACT

The invention provides an opto-electronic scale reading apparatus comprising a read head in which a plurality of optical emitter and receiver pairs are arranged so that beams of collimated light generated by the respective emitters fall on a common region of a scale. Compared to arrangements where the light beams fall on separate regions of the scale, the apparatus according to the invention is relatively immune to the effects of certain misalignments between the scale and the read head.

22 Claims, 6 Drawing Sheets

OPTO ELECTRONIC SCALE READING APPARATUS WHEREIN EACH OF A PLURALITY OF DETECTORS RECEIVES LIGHT FROM A CORRESPONDING EMITTER OF A PLURALITY OF LIGHT EMITTERS

This application is a continuation of application Ser. No. 07/159,363, filed Feb. 18, 1988, now abandoned.

BACKGROUND OF THE INVENTION

This invention relates to opto-electronic scale reading apparatus of the kind comprising a scale defined by spaced lines, a read head, the read head and the scale being relatively movable in the direction of spacing of the lines; a plurality of units embodied in the read head and each comprising a light emitter for illuminating a region of the scale, a light receiver for receiving light from the illuminated region, grating means arranged in the light path between the emitters and the receivers for producing in respect of each unit a light modulation corresponding to the relative movement of the scale and the read head, wherein the light modulations of the respective units occur in phase-shifted relationship. The phase-shifted relationship is required for determining direction of movement and, possibly, position interpolation between scale lines.

Such an apparatus is known generally from GB No. 1,504,691 wherein the light modulations are in the form of moire fringes and wherein the units are positioned to read the fringes in phases separated by 90°. The units are positioned to read the respective phases from different portions of the scale lines along the length thereof. As a result, if there is any yaw misalignment between the read head and the scale, the resulting moire error leads to a significant phase error with consequent difficulty regarding interpolation. Yaw misalignment is angular misalignment about an axis normal to the length and to the direction of spacing of the scale lines. A moire error is an error in the period of the moire fringes. A phase error is said to occur if the phase separation between said units differs from their nominal value of 90°.

Also, since the known apparatus reads the respective phases from different portions of the scale lines along the length thereof, the apparatus is sensitive to variations in such parameters as straightness, parallelity and reflectivity along the length of those lines.

SUMMARY OF THE INVENTION

The foregoing difficulties are reduced or avoided by my invention wherein the respective units are positioned so that the light emitters illuminate a region of the scale which is substantially common to all of the emitters.

BRIEF DESCRIPTION OF THE DRAWINGS

Embodiments of apparatus according to this invention will now be described with reference to the accompanying drawings wherein.

DESCRIPTION OF THE PREFERRED EMBODIMENTS

Figure 1:
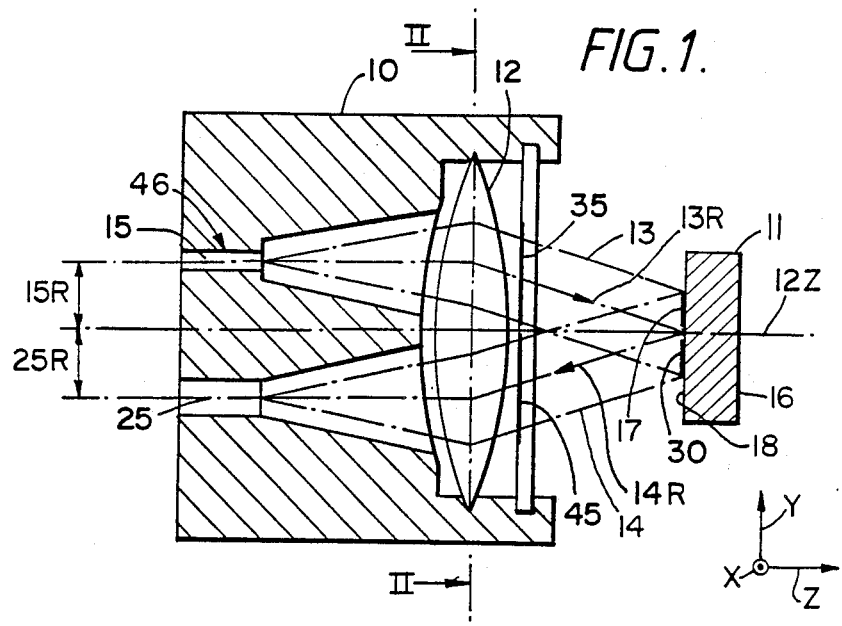
FIG. 1 is a sectional view of a first embodiment of the apparatus.

Referring to FIGS. 1 to 4, the apparatus is described with reference to the coordinates X, Y, Z of the orthogonal coordinate system. A read head 10 is movable relative to a scale 11 in the X-direction. The scale 11 comprises a body 16 having scale marks defined by lines 17 extending in the Y-direction and spaced in the X-direction. The lines lie at an XY surface 18 of the scale 11. The read head 10 comprises a collimating system in the form of an axisymmetric collimating lens 12 having an optical axis 12Z perpendicular to an XY plane. The lens 12 is arranged for its collimating side to face the scale 11. The other or focussing side of the lens 12 faces an array of three light emitters 15 and three light receivers 25 all arranged about the axis 12Z in a common XY plane perpendicular thereto. In the present example the emitters 15 and receivers 25 are opto-electronic diodes. Each emitter 15 is substantially a point source of divergent light and is spaced from the axis 12Z by a radial offset 15R. As a result the lens 12 produces an incident beam 13 of collimated light projected along an axis 13R toward the axis 12Z. It will be clear that, by virtue of the offsets 15R, the axes 13R associated with the respective beams 13 intersect at a common point 30P and the beams 13 intersect at a common region 30 lying in an XY plane. The relative position of the read head 10 and the scale 11 in the Z-direction is such that the region 30 lies at the surface 18. The incident beams 13 are reflected by the scale 11 to produce reflected beams 14 having axes 14R. The lens 12 focusses the beams 14 on to the respective receivers 25 which are spaced from the axis 12Z by radial offsets 25R corresponding to the offsets 15R.

It may be said that the emitters 15 define a group of emitting devices having the lens 12 in common, and that the receivers 25 define a group of receiving devices having the lens 12 in common. In the present example the lens 12 is common to both said groups.

Figure 2:
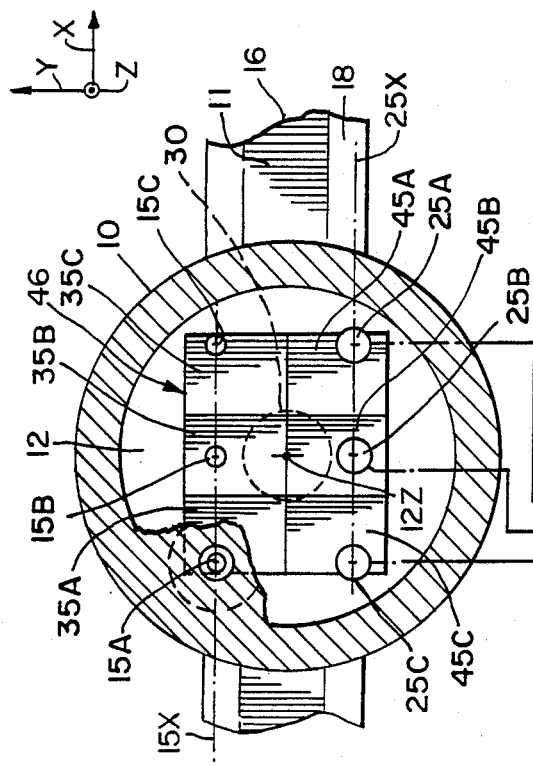
FIG. 2 is a section on the line II—II in FIG. 1 and an associated circuit diagram.
Figure 4:
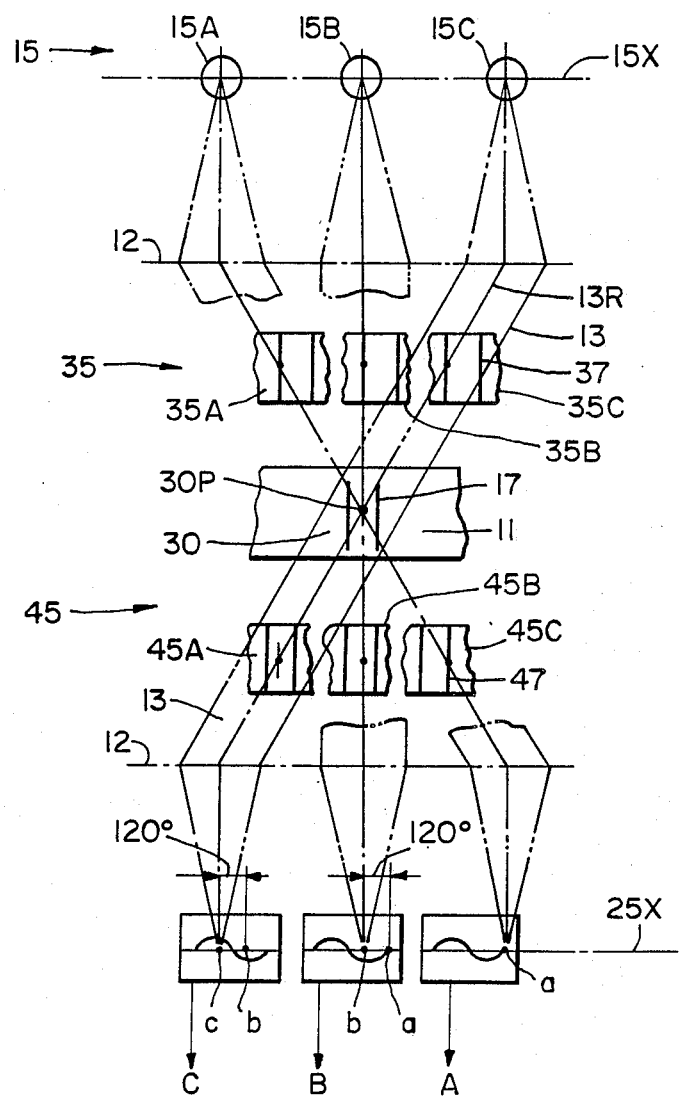
FIG. 4 is an expanded diagram representation of FIG. 3 and an associated phase diagram.

As shown in FIGS. 2 and 4 there are three pairs of associated emitters and receivers denoted 15A, 25A; 15B, 25B; 15C, 25C, wherein the two elements of each pair, e.g. 15A, 25A, are situated on diametrically opposite sides of the axis 12Z as required by the lens 12. In the present example the emitters and receivers are arranged so that the emitters are spaced along a line 15X extending in the X-direction at one side of the axis 12Z and the receivers are correspondingly spaced along a line 25X in the X-direction at the other side of the axis 12Z. Each pair of emitters and receivers 15, 25 is associated with a pair of gratings 35, 45 situated respectively in the projected and the reflected beams 13, 14 between the lens 12 and the scale 11. Thus there are three grating pairs 35A, 45A; 35B, 45B; 35C, 45C, associated respectively with the emitter and receiver pairs 15A, 25A; 15B, 25B; 15C, 25C. The gratings 35, 45 lie in a common XY-plane and are defined by lines 37, 47 which are parallel to the lines 17 of the scale.

Each pair of emitters and receivers 15, 25 and the associated pair of gratings 35, 45 are referred to as a phase unit 46. Each phase unit 46 is designed so that, during said relative movement of the scale and the read head, the relevant receivers 25A, 25B, 25C see respective sinusoidal light modulations M, respectively denoted MA, MB, MC, produced by the optical interaction of the scale 11 with the gratings 35, 45 of the respective unit 46. The modulations M have a period which is constant with respect to the pitch of the scale lines 17. However, each modulation M may be regarded as a moire fringe manifest as the alternation of light and dark distributed over the aperture of the receiver. So long as the lines 17, 37, 47 are absolutely parallel the period of the moire fringes is said to be equal to infinity. Otherwise that period is finite.

The gratings of each grating pair 35, 45 have a phase separation which is offset from the corresponding phase separation of each of the other pairs nominally by 120°. In other words the phase interval between any adjacent pair MA, MB or MB, MC or MC, MA is nominally 120° (FIG. 4).

The receivers 25 have electrical outputs A, B, C which have the same phase separation as the modulations M.

The modulations M may be produced by optical interaction of the scale and thhe gratings as described in our Intenational Application No. PCT/GB85/00600 published Jul. 3, 1986 or by any other such interaction.

The signals A, B, C are connected to a circuit 50 having differential amplifiers 51, 52 for producing signal values B−A and B−C, and further differential amplifiers connected to produce signal values A−C and 2B−(A+C) which define respectively the sine and cosine terms of any one of the signals A, B, C. The operation of the circuit 50 may be described as three-phase derivation of the sine and cosine terms of the light modulations independently of light level. Four-phase derivation may be used but three-phases are more appropriate in the context of this invention because it requires only three emitter and receiver pairs which are more readily accommodated in the aperture of the lens, compared to four such pairs normally required for four phases.

Figure 3:
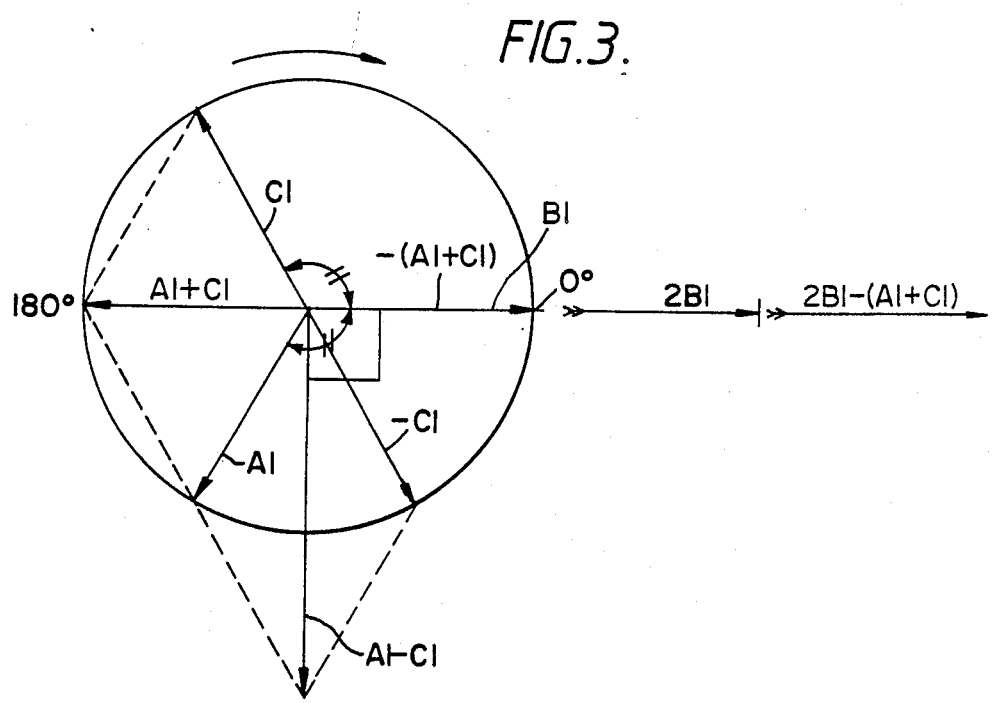
FIG. 3 is a diagram for explaining the vector geometry associated with the above circuit diagram.

Referring to FIG. 3, the three outputs A, B, C are shown as vectors A1, B1, C1. The vectors A1 and C1 respectively lead and trail the vector B1. The vector sum −(A1+C1) has the same phase angle as the vector B1 and occurs between the vectors A1, C1 and the vector sum 2B1−(A1+C1) is shown superimposed on the vector B1. The vector sum A1−C1 occurs between the vectors A1, B1 at an angle of 90 degs. with the vector B1, thus signifying the sine and cosine relationship between the terms 2B−(A+C) and A−C. Said 90 deg. relationship is preserved so long as the vector A1, C1 respectively lead and trail the vector B1 by like amounts, and this relationship is not disturbed (within reasonable limits) by the absolute values of the phase angles between the vectors A1, C1 and C1, B1. Also the circuit operates to compensate for phase errors so long as these errors are uniform, i.e. so long as the vectors A1 and C1 lead and trail the vector B1 by like amounts as mentioned herein above.

Reference is now made to how the apparatus copes with errors which may arise from manufacturing tolerances. It will be clear that since the axes 13R intersect at the common point 30P so that the region 30 is common to the three phase units 46, the apparatus according to this invention is substantially immune to errors due to variations in reflectance or phase differences between different portions of the scale. Also the scale 11 can be narrow in the Y-direction compared to a scale where three or perhaps four phase units require separate regions of the scale spaced in the Y-direction.

Regarding a yaw misalignment and consequent moire and phase errors, a yaw error would exist if the angular position of the read head 10 relative to the scale 11 about a Z-axis, e.g. the axis 12Z, is such that the lines 17, 37, 47 are not parallel. This would result in a moire error, i.e. in the period of the moire fringes becoming finite, and would result in a corresponding change in the phase separation of the modulations M. However, since the axes 13R intersect at the common point 30P the arrangement is optically equivalent to each unit 46 lying, notionally, on the axis 12Z. Hence the phase separation between the modulations M remain unchanged.

Figure 5:
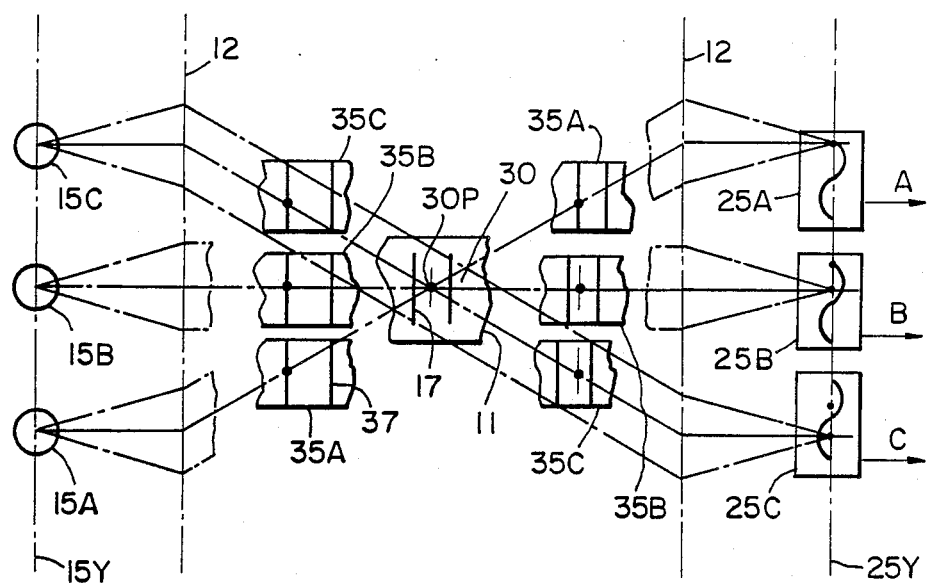
FIG. 5 is a view similar to FIG. 4 but shows a modification.

A tolerance in the stand-off of the read head, i.e. in the spacing of the read head 10 and the scale 11 in the Z-direction, may result in the common point 30P not lying exactly at the plane 18. As a result, since the emitters and receivers are aligned in the X-direction, there is produced a phase error by triangulation. This condition can be eliminated or reduced by arranging the emitters and receivers along respective lines in the Y-direction instead of in the X-direction as shown in FIG. 5. This results in the axes 13R not intersecting the plane 18 at the same point 30P but the intersections occur at three points one of which is one the axis 12Z while the other two are spaced to opposite sides thereof in the Y-direction so that there can be no phase error. However, when the emitters and receivers are so aligned, a yaw misalignment will produce moire fringes of finite period with a consequent occurrence of equal phase errors between adjacent pairs of the modulations M. This condition can be tolerated because equal phase errors can be eliminated by the circuit 50 as mentioned above.

Figure 6:
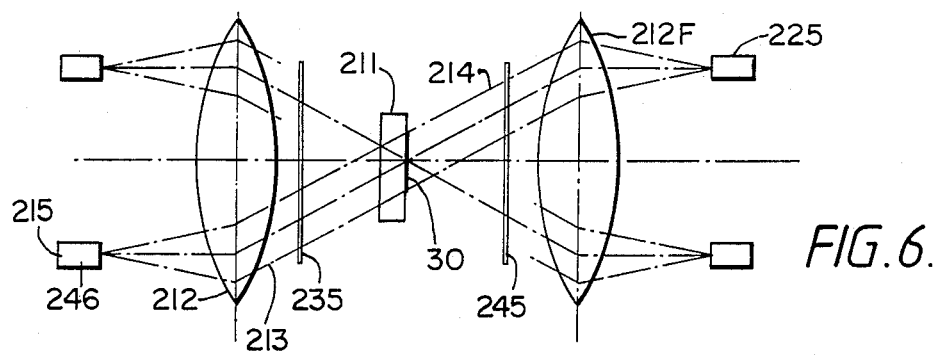
FIG. 6 is a sectional view of a second embodiment of the apparatus.

Referring to FIG. 6, there is shown apparatus similar to that shown in FIGS. 1–4 but applied to a transmissive scale 211. The apparatus comprises three phase units 246 wherein three light emitters 215 illuminate a first collimating lens 212 which produces collimated beams 213 converging to a common region 30 from which the beams emerge as emergent beams 214 which are focussed by a focussing lens 212F on to respective light receivers 225. Gratings 235, 245 in the beams 213, 214 produce light modulations substantially as described with reference to FIGS. 1 to 4. The lens 212 is common to the group of emitters 215. The lens 212F is common to the group of receiver 225. Either group could have individual lenses for its emitters or receivers as the case may be.

Figure 7:
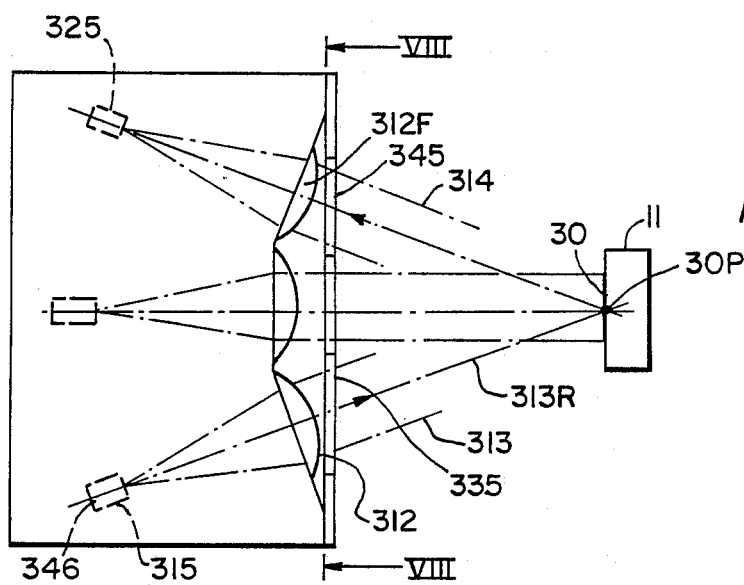
FIG. 7 is a sectional view of a third embodiment of the apparatus.
Figure 8:
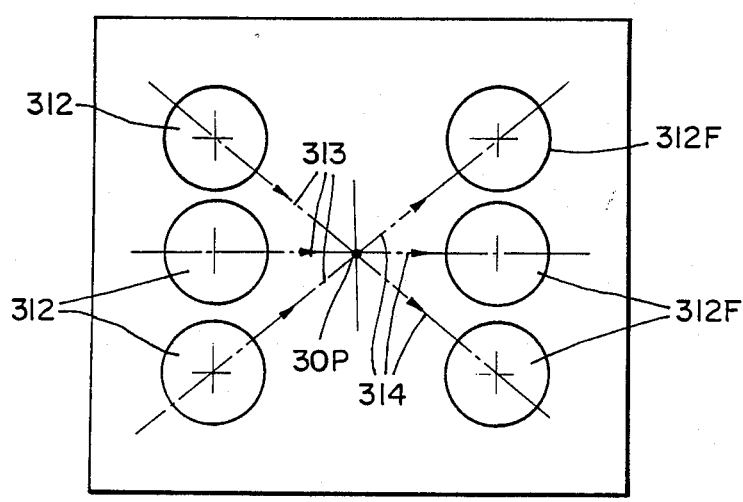
FIG. 8 is a view on the line VIII—VIII of FIG. 7.

Referring to FIGS. 7 and 8, the apparatus shown comprises three phase units 346 wherein three light emitters 315 illuminate respective collimating lenses 312 defining individual collimating systems for the respective units.

The lenses 312 produce collimated beams 313 along respective convergent axes 313R converging on to a common region 30 on a scale 11 which reflects the light in the form of beams 314 and through focussing lenses 312F on to respective receivers 325. Gratings 335, 345 which intercept beams 313, 314, produce light modulations substantially as described with reference to FIGS. 1-4.

Figure 9:
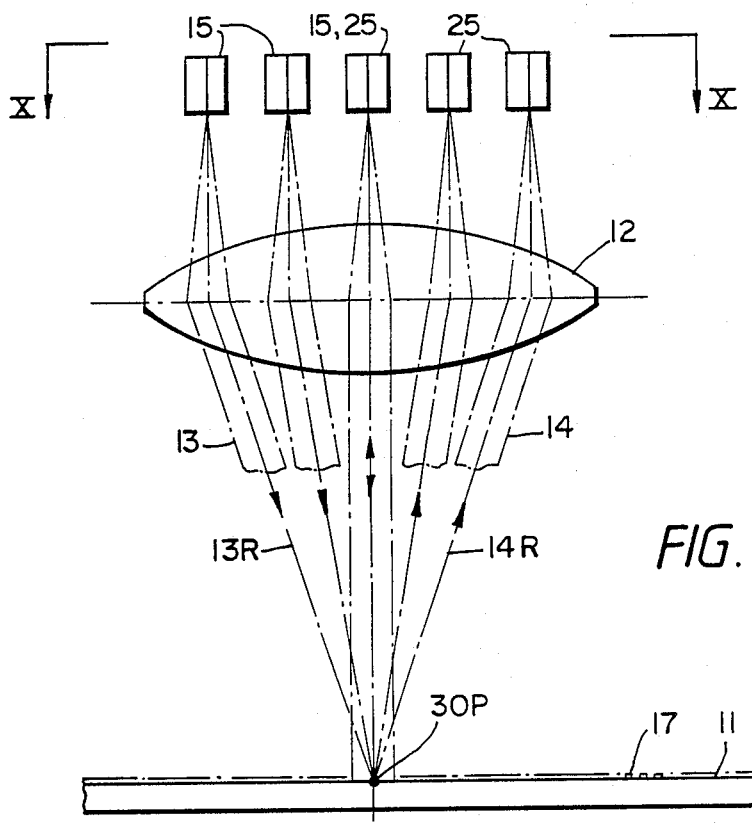
FIG. 9 is a view of a fourth embodiment.
Figure 10:
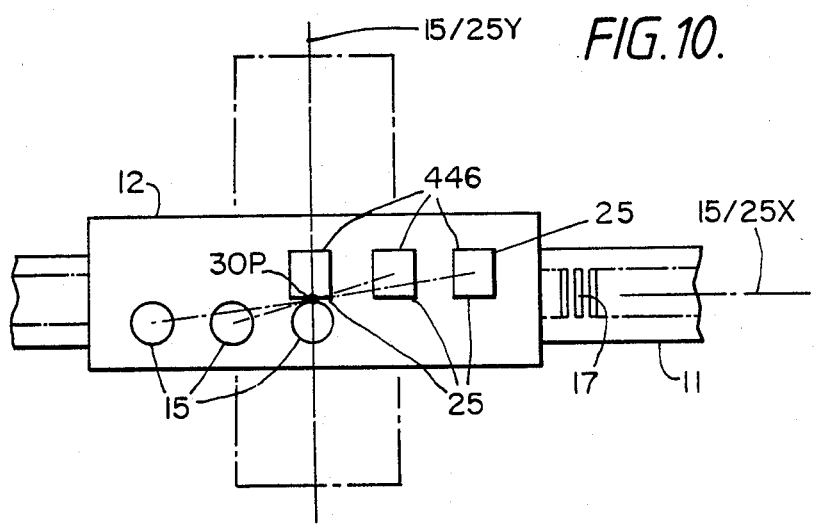
FIG. 10 is a view on the line X—X in FIG. 9.

Referring to FIGS. 9 and 10, the apparatus shown comprises three phase units 446 having emitters 15 and receivers 25 arranged substantially on a common line 15/25X extending in the X-direction or, as shown in broken lines, substantially on a common line 15/25Y extending in the Y-direction. It will be seen that the emitter-receiver pair 15, 25 situated nearest the axis 12Z may be situated directly adjacent one another as shown.

It will be understood that the emitters may each be constituted by one end of a light transmitting fibre whose other end is connected to the appropriate receiving diode. Regarding the emitter/receiver pair situated nearest the axis 12Z, this pair may comprise a concentric emitter/receiver device or may be constituted by the end of a single light-transmitting fibre concentric with the axis 12Z and adaptic to transmit both the incident and the reflected light

I claim:

1. An opto-electronic scale reading apparatus comprising
   a scale defined by spaced lines;
   a read head, said read head and said scale being relatively movable in the direction of spacing of said spaced lines;
   a plurality of phase units located in said read head, each of said phase units comprising
      a light emitter for illuminating a region of said scale;
      a light receiver for receiving light from said illuminated region; and
      grating means positioned in the light path between said emitters and said receivers for producing in respect of each of said phase units a light modulation corresponding to the relative movement of said scale and read head, said light modulations of said respective phase units occurring in a phase-shifted relationship, wherein
   said phase units are positioned so that their respective light emitters illuminate a region of said scale whic is substantially common to all said emitters, and the receiver of each of said phase units receives only light from the emitter of the respective phase unit.

2. Apparatus according to claim 1, comprising means associated with each said emitter for producing a beam of collimated light and arranged so that the beams pertaining to the respective emitters extend along axes which intersect substantially at a common point.

3. Apparatus according to claim 1 which further comprises an optical collimating system having an axis, a focusing side and a collimating side, the light emitters of said phase units being situated on the focussing side of said system in positions spaced from said axis, whereby collimated beams generated by said emitters at the collimating side of said system intersect substantially at a common point.

4. Apparatus according to claim 3 wherein said collimating system comprises a collimating lens which is common to at least one of the phase unto defining respectively the emitters and the receivers.

5. Apparatus according to claim 3 wherein said colimating system comprises individual collimating lenses for at least one of the phase unto defining respectively the emitters and the receivers.

6. Apparatus according to claim 4 wherein the scale is reflective and the receivers are situated at the same side of the scale.

7. Apparatus according to claim 4 wherein the scale is transmissive and the emitters and receivers are situated at opposite sides of the scale.

8. Apparatus according to claim 1 wherein the emitters pertaining to the resepctive phase units are arranged along a line parallel to the direction of spacing of the scale lines.

9. Apparatus according to claim 1 wherein the emitters of the respective phase units are spaced along a line at right angles to the direction of the spacing of the scale lines.

10. Apparatus according to claim 1 comprising three said phase units and means coupled to said light receivers for establishing signals defining a quadrature relationship between the phases of said modulations.

11. An opto-electronic scale reading apparatus comprising
    a scale defined by spaced lines;
    a read head, said read head and said scale being relatively movable in the direction of spacing of said spaced lines;
    means for producing a plurality of light beams, each of said light beams defining a beam path;
    means for receiving a plurality of light beams,
    grating means positioned in each of said beam paths between the means for producing the beams and the means for receiving the beams, said grating means producing in respect of each beam a light modulation corresponding to the relative movement of said scale and said head, the light modulations of the respective beams occurring in a phase-shifted relationship, wherein the beams illuminate a common region of said scale, and said means for receiving said plurality of light beams comprises a plurality of detectors, each of said detectors detecting only one of said light beams.

12. Opto-electronic scale reading apparatus comprising
    a scale defined by spaced lines;
    a read head, the read head and the scale being relatively movable in the direction of spacing of the said lines, said read head comprising:
    means for projecting light onto a region of the scale, the scale passing the light on, the light having an incident path toward the scale and a return path away from the scale;
    a first grating means provided in the incident path;
    an analyzer grating means provided in the return path; and
    means distinct from the scale, for providing the light passed on by the scale in the form of a plurality of light beams;
    said scale and said first grating means cooperating to produce at the analyzer grating means in respect of each of the said beams a light intensity modulation corresponding to relative movement of the scale and the read head; and all light producing the said intensity modulations at the analyzer grating means passing from said incident to said return path via said region of the scale;
    a plurality of detectors, each detector being positioned downbeam of the analyzer grating means to detect only one of the said beams wherein each detector produces an output signal corresponding to the said light modulation of the respective beam; and
    means for producing the said light modulations of the respective beams in a phase-shifted relationship.

13. An apparatus according to claim 12 wherein the first grating means is a one-dimensional grating and the scale is a one-dimensional scale, both the first grating means and the scale having lines extending parallel to only a single direction.

14. An apparatus according to claim 12 wherein the first grating means, the scale and the analyzer grating means all lie in substantially parallel planes.

15. An apparatus according to claim 14 wherein the means for producing the said plurality of light beams produces three beams and the phase-shifted relationship between any given pair of the three beams is an integer multiple of 120°.

16. An apparatus according to claim 14 wherein the analyzer grating means comprises an individual grating for each beam, all the said individual gratings having lines of identical pitch, and each of the said individual gratings being offset from an adjacent individual grating by a fraction of the said pitch, thereby to produce the said light modulations in the phase-shifted relationship.

17. An apparatus according to claim 12 wherein each of the said output signals is input to a means for producing a pair of sinusoidally varying signals having a quadrature relationship.

18. An apparatus according to claim 12 wherein the said light modulations are of a sinusoidal character, and have secondary components due to manufacturing tolerance in the scale.

19. An apparatus according to claim 18 further comprising a signal processing means for processing the said output signals to produce a pair of sinusoidally varying signals having a quadrature relationship, and which are substantially free from any said secondary components common to all said light modulations.

20. An apparatus according to claim 14 wherein said scale is reflective, and wherein the first grating means and the analyzer grating means are transmissive.

21. Opto-electronic scale reading apparatus comprising
   a scale defined by spaced lines;
   a read head, the read head and the scale being relatively movable in the direction of spacing of the said lines, said read head comprising:
   means for projecting light onto a region of the scale;
   a first grating means provided in the path of light incident upon the scale;
   an analyzer grating means, the analyzer grating means being positioned in the path of light passed on by the scale; and
   means distinct from the scale, for providing the light passed on by the scale in the form of a plurality of beams, the beams being mutually divergent and the light in each of the beams having the said region in common;
   said scale and said first grating means cooperating to produce at the analyzer grating means in respect of each of the beams a light intensity modulation corresponding to said relative movement of the scale and the read head;
   a plurality of detectors, each detector being positioned downbeam of the analyzer grating means and to detect only one of the said light beams, wherein each detector produces an output signal corresponding to the said light modulation of the respective beam; and
   means for producing the said light modulations of the respective beams in a phase-shifted relationship.

22. Opto-electronic scale reading apparatus comprising a scale and a read head having a light source, and wherein the scale and a first grating of the read head are arranged to interact in operation, to pass light emitted by said light source toward a second grating of the read head and produce light modulations at and downbeam of the second grating for identifying relative movement of the scale and the read head;
   said read head comprising:
   means for projecting said light onto a region of the scale and the scale being arranged to pass on said light from said region toward the second grating; and
   means distinct from the scale for producing a plurality of divergent beams from said light passed on from said region toward the second grating;
   said beams, by virtue of their divergence, producing said light modulations in regions which are mutually distinct but which have the light from said region of the scale in common;
   means for producing the modulations pertaining to said distinct regions in phase-shifted relationship; and
   individual detectors for detecting the respective said phase-shifted modulations.

* * * * *